(12) United States Patent
Yoon et al.

(10) Patent No.: US 12,523,919 B2
(45) Date of Patent: Jan. 13, 2026

(54) CAMERA MODULE

(71) Applicant: Samsung Electro-Mechanics Co., Ltd., Suwon-si (KR)

(72) Inventors: Young Bok Yoon, Suwon-si (KR); Sung Hoon Kim, Suwon-si (KR); Yoo Chang Kim, Suwon-si (KR); Bong Won Jeong, Suwon-si (KR); Bo Sung Seo, Suwon-si (KR); Jung Seok Lee, Suwon-si (KR); Soo Cheol Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 261 days.

(21) Appl. No.: 16/887,038

(22) Filed: May 29, 2020

(65) Prior Publication Data

US 2021/0048729 A1    Feb. 18, 2021

(30) Foreign Application Priority Data

Aug. 16, 2019   (KR) .................. 10-2019-0100296
Dec. 17, 2019   (KR) .................. 10-2019-0169205

(51) Int. Cl.
  *G02B 7/04*   (2021.01)
  *G02B 27/64*   (2006.01)
  (Continued)

(52) U.S. Cl.
  CPC .............. *G03B 5/04* (2013.01); *G02B 7/04* (2013.01); *G02B 27/646* (2013.01); *G03B 13/34* (2013.01);
  (Continued)

(58) Field of Classification Search
  CPC . G03B 5/00; G03B 5/04; G03B 13/36; G03B 2205/0007; G03B 2205/0053;
  (Continued)

(56) References Cited

U.S. PATENT DOCUMENTS

2014/0160311 A1*  6/2014  Hwang ............... G02B 27/646
                                                        348/208.99
2014/0362284 A1   12/2014  Shin et al.
  (Continued)

FOREIGN PATENT DOCUMENTS

CN      105652557 A       6/2016
KR  10-2012-0061283 A    6/2012
  (Continued)

OTHER PUBLICATIONS

Korean Office Action issued on Feb. 5, 2021 in counterpart Korean Patent Application No. 10-2019-0169205 (7 pages in English)(5 pages in Korean).
  (Continued)

*Primary Examiner* — Marin Pichler
(74) *Attorney, Agent, or Firm* — NSIP Law (57) ABSTRACT

A camera module includes a housing accommodating a lens module and a carrier, a focusing unit including a first magnet disposed in the carrier and a first coil disposed on a first substrate on the housing, and a shake correction unit including a second magnet and a third magnet disposed in the lens module, and a second coil and a third coil disposed on a second substrate on the carrier. The first magnet and the first coil face each other in a first direction. The second magnet and the second coil face each other in the first direction, and the third magnet and the third coil face each other in a second direction. The second magnet and the second coil,
  (Continued)

and the third magnet and the third coil, move together in an optical axis direction by driving force generated by the first magnet and the first coil.

15 Claims, 7 Drawing Sheets (51) Int. Cl.
*G03B 5/04* (2021.01)
*G03B 13/34* (2021.01)

(52) U.S. Cl.
CPC ............. *G03B 2205/0015* (2013.01); *G03B 2205/0069* (2013.01)

(58) Field of Classification Search
CPC .... G03B 2205/0015; G03B 2205/0069; G03B 3/02; G03B 3/10; G03B 13/34; G03B 30/00; G02B 7/021; G02B 7/04; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; H02K 11/33; H02K 41/0356
USPC ....... 359/911, 554, 555, 557, 811, 813, 814, 359/824, 872, 877
See application file for complete search history.

(56) References Cited

U.S. PATENT DOCUMENTS

| | | | |
|---|---|---|---|
| 2015/0049209 A1 | 2/2015 | Hwang et al. | |
| 2015/0296112 A1* | 10/2015 | Park | G02B 7/08 348/208.7 |
| 2016/0154204 A1 | 6/2016 | Lim et al. | |
| 2016/0306185 A1 | 10/2016 | Hu et al. | |
| 2017/0108705 A1* | 4/2017 | Yu | G03B 5/00 |
| 2018/0278850 A1* | 9/2018 | Kim | H04N 5/2257 |

FOREIGN PATENT DOCUMENTS

| | | |
|---|---|---|
| KR | 10-2014-0144126 A | 12/2014 |
| KR | 10-2015-0020951 A | 2/2015 |
| KR | 10-1518825 B1 | 5/2015 |
| KR | 10-2015-0118005 A | 10/2015 |
| KR | 10-2007207 B1 | 8/2019 |

OTHER PUBLICATIONS

Chinese Office Action issued on Apr. 26, 2022, in counterpart Chinese Patent Application No. 202010800375.1 (3 pages in English and 5 pages in Chinese).

* cited by examiner

CAMERA MODULE

CROSS-REFERENCE TO RELATED APPLICATION(S)

This application claims the benefit under 35 USC 119(a) of Korean Patent Application Nos. 10-2019-0100296 filed on Aug. 16, 2019 and 10-2019-0169205 filed on Dec. 17, 2019 in the Korean Intellectual Property Office, the entire disclosures of which are incorporated herein by reference for all purposes.

BACKGROUND

1. Field

The following description relates to a camera module.

2. Description of Related Art

Camera modules have been used in mobile communications terminals such as tablet personal computers (PCs), laptop computers, and the like, as well as in smartphones.

The camera module is provided with an actuator moving a lens module to perform a focusing function and a shake correction function. The actuator moves the lens module in an optical axis direction and a direction, perpendicular to an optical axis, using driving force generated by a magnet and a coil.

However, since the lens module is moved in the optical axis direction during a focusing operation, a relative position of a magnet and a coil for shake correction (a position of the magnet and the coil in the optical axis direction) may also vary.

When the relative position of the magnet and the coil for shake correction (the position of the magnet and the coil in the optical axis direction) varies, it may be difficult to precisely control driving force generated by the magnet and the coil for shake correction (driving force in the direction, perpendicular to the optical axis).

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module capable of improving shake correction performance and focusing performance.

In one general aspect, a camera module includes a carrier accommodating a lens module therein, a housing accommodating the lens module and the carrier therein, a focusing unit including a first magnet disposed in the carrier and a first coil disposed on a first substrate disposed on the housing, and a shake correction unit including a second magnet and a third magnet disposed in the lens module, and a second coil and a third coil disposed on a second substrate disposed on the carrier. The first magnet and the first coil are disposed to face each other in a first direction perpendicular to an optical axis. The second magnet and the second coil are disposed to face each other in the first direction perpendicular to the optical axis, and the third magnet and the third coil are disposed to face each other in a second direction perpendicular to the optical axis. The second magnet and the second coil, and the third magnet and the third coil, are moved together in an optical axis direction by driving force generated by the first magnet and the first coil.

The second substrate may include an extension portion movable in the optical axis direction by the driving force generated by the first magnet and the first coil.

At least a portion of the extension portion may be curved.

The second substrate may include a body portion on which the second coil and the third coil are disposed, and the extension portion may extend from the body portion.

The body portion may be disposed on a side surface of the carrier, and the extension portion may be disposed between the carrier and the housing.

The carrier may define a through-hole through which light passes, and at least a portion of the extension portion may be bent along a circumference of the through-hole.

The extension portion may have a first end connected to the body portion and a second end connected to the housing, and the second end of the extension portion may include a connection portion to receive an electrical signal.

The connection portion may be exposed outwardly of the housing through an opening disposed in a side surface of the housing.

The first substrate may be disposed on the side surface of the housing.

The second coil and the third coil may both be disposed closer to the optical axis than the first coil.

The shake correction unit may include a frame to guide a movement of the lens module, and the frame and the lens module may move together in the first direction by driving force generated by the second magnet and the second coil.

A reinforcing plate may be disposed inside the frame, and a portion of the reinforcing plate may be exposed outwardly of the frame.

The lens module may move in the second direction by driving force generated by the third magnet and the third coil.

In another general aspect, a camera module includes a carrier accommodating a lens module therein, a housing accommodating the lens module and the carrier therein, a focusing unit including a first magnet disposed on the carrier and a first coil disposed to face the first magnet in a first direction perpendicular to an optical axis, a shake correction unit including a second magnet and a second coil disposed on the lens module to face each other in the first direction perpendicular to the optical axis, and a third coil and a third magnet disposed on the lens module to face each other in a second direction perpendicular to the optical axis, and a substrate, on which the second coil and the third coil are disposed, disposed on the carrier. The lens module, the carrier, the second magnet and the third magnet, the second coil and the third coil, and the substrate move together in an optical axis direction by a driving force generated by the first magnet and the first coil. A portion of the substrate is disposed on the housing.

The substrate may include a first body portion on which the second coil is disposed, a second body portion on which the third coil is disposed, and an extension portion extending from one of the first body portion and the second body portion and disposed between the carrier and the housing.

The extension portion may include a connection portion to receive an electrical signal, and the connection portion may be fixed to the housing.

The first direction may be perpendicular to the second direction.

The first body portion may be elongated in the first direction, the second body portion may be elongated in the second direction, and the extension portion may be elongated in the first direction or the second direction and curved along the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

The examples relate to a camera module that may be used in a portable electronic device such as a mobile communications terminal, a smartphone, or a tablet personal computer (PC).

Figure 1:
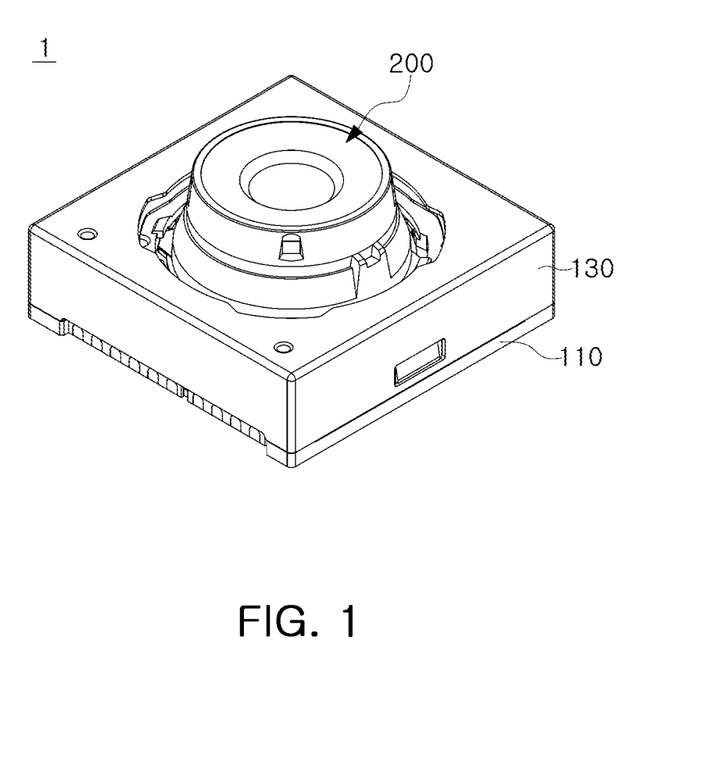
FIG. 1 is a perspective view of a camera module according to an example.
Figure 2:
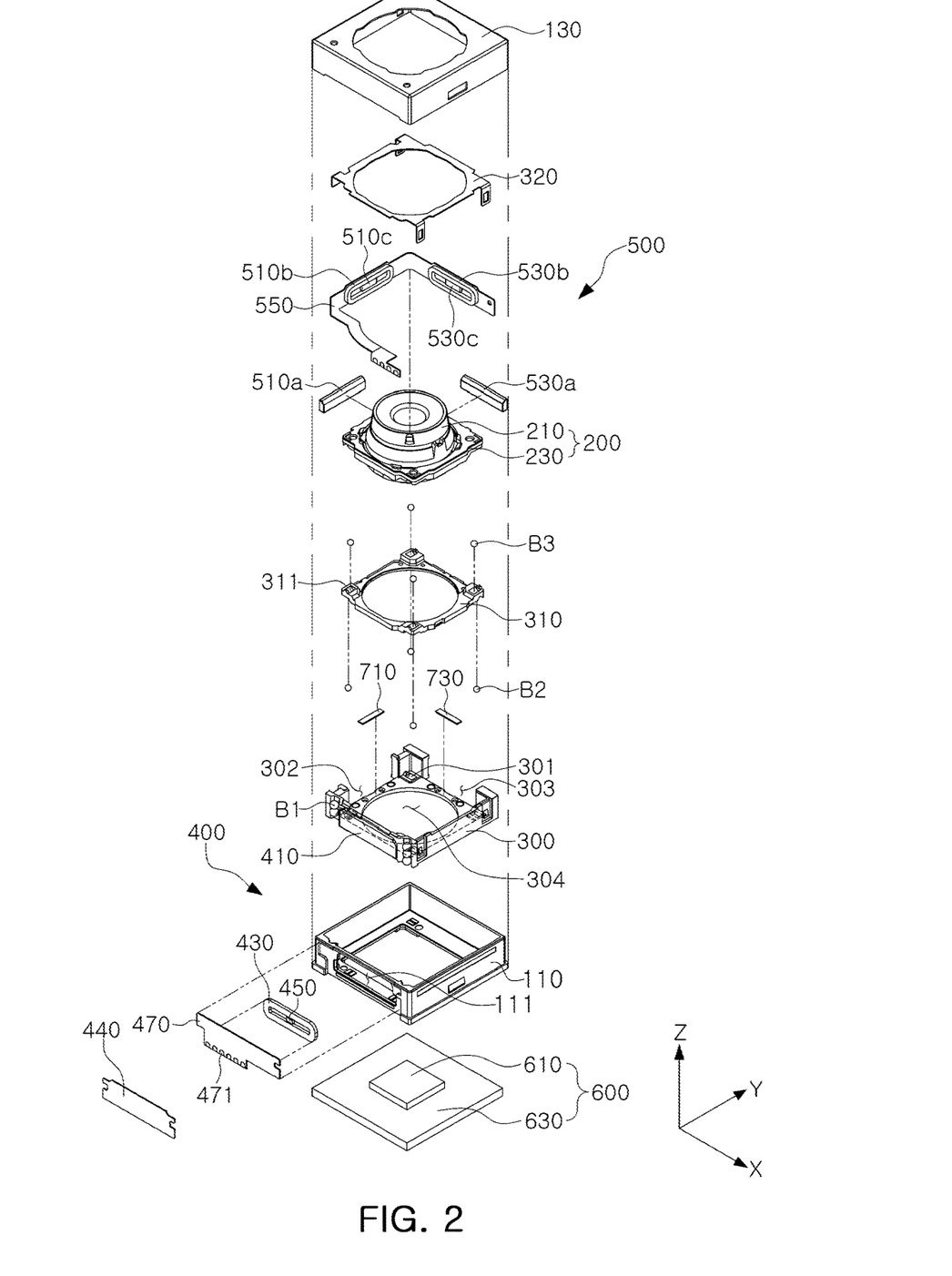
FIG. 2 is a schematic exploded perspective view of the camera module according to an example.

FIG. 1 is a perspective view of a camera module according to an example, and FIG. 2 is a schematic exploded perspective view of the camera module according to an example.

Figure 3:
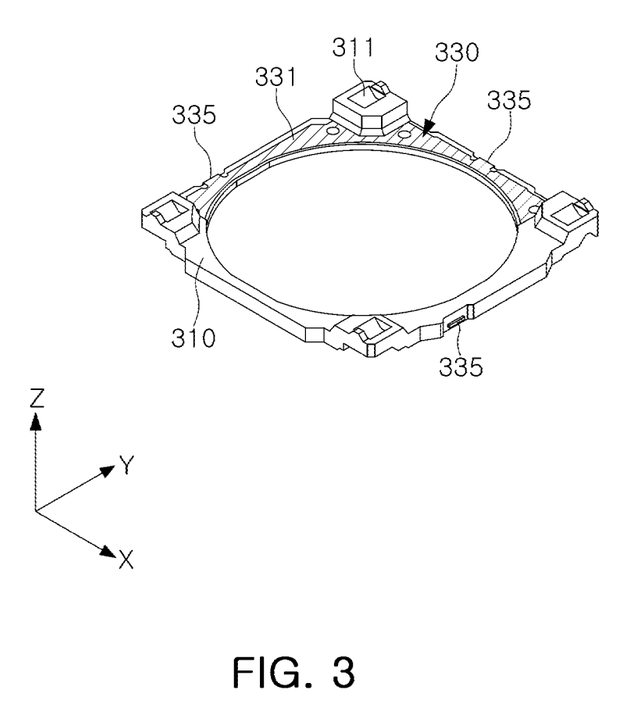
FIG. 3 is a perspective view of a frame.
Figure 4:
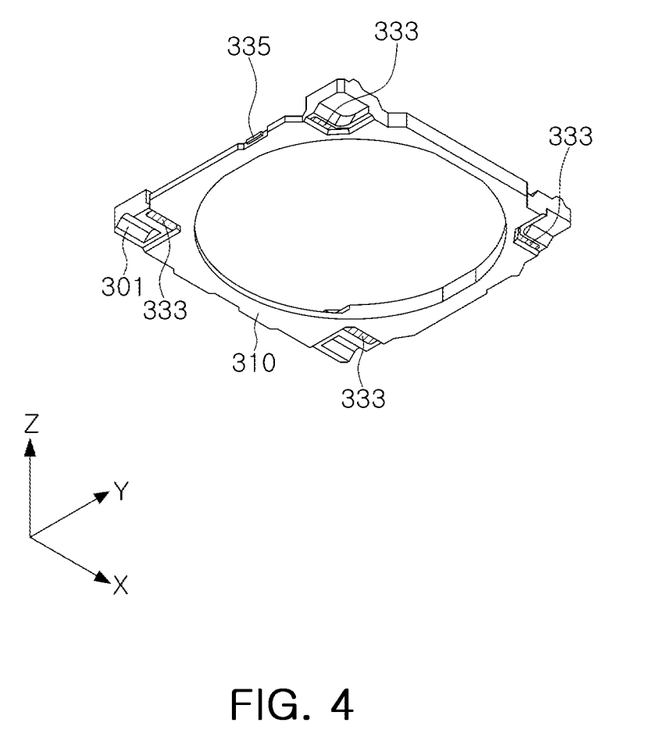
FIG. 4 is a bottom perspective view of the frame.

FIG. 3 is a perspective view of a frame, and FIG. 4 is a bottom perspective view of the frame.

Referring to FIGS. 1 and 2, a camera module 1 may include a lens module 200, a lens driving device for moving the lens module 200, an image sensor module 600 for converting light incident thereto through the lens module 200 into an electrical signal, a housing 110 accommodating the lens module 200 and the lens driving device therein, and a case 130 coupled to the housing 110.

The lens module 200 may include a lens barrel 210 and a lens holder 230.

The lens barrel 210 may accommodate at least one lens that is configured to capture a subject. When a plurality of lenses is arranged in the lens barrel 210, they are mounted inside the lens barrel 210 along an optical axis. The lens barrel 210 has a hollow cylindrical shape and is coupled to the lens holder 230.

The lens driving device moves the lens module 200.

As an example, the lens driving device moves the lens module 200 in an optical axis (a Z-axis) direction to focus lenses, and moves the lens module 200 in a direction perpendicular to the optical axis (the Z-axis) to correct shake when capturing an image.

The lens driving device may include a focusing unit 400 for focusing the lenses and a shake correction unit 500 for correcting the shake.

The image sensor module 600 is a device for converting light, incident through the lens module 200, into an electrical signal.

As an example, the image sensor module 600 may include an image sensor 610 and a printed circuit board (PCB) 630 connected to the image sensor 610, and may further include an infrared filter.

The infrared filter cuts off light in an infrared region in the light incident thereto through the lens module 200.

The image sensor 610 converts light, incident thereto through the lens module 200, into an electrical signal. As an example, the image sensor 610 may be a charge-coupled device (CCD) or a complementary metal-oxide-semiconductor device (CMOS).

The electrical signal, converted by the image sensor 610, is output as an image through a display unit of a portable electronic device.

The image sensor 610 is fixed to the printed circuit board 630, and is electrically connected to the printed circuit board 630 by wire bonding.

The lens module 200 is accommodated in the housing 110. As an example, the housing 110 has an open top and an open bottom, and the lens module 200 is accommodated in an internal space of the housing 110.

The image sensor module 600 is disposed on the bottom of the housing 110.

The case 130 is coupled to the housing 110 to cover an external surface of the housing 110, and serves to protect the internal components of the camera module 1.

Hereinafter, the focusing unit 400 of the lens driving device will be described with reference to FIG. 2.

The lens driving device moves the lens module 200 to focus lenses on a subject.

As an example, the camera module 1 includes the focusing unit 400 for moving the lens module 200 in the optical axis direction (the Z-axis direction).

The focusing unit 400 includes a carrier 300, accommodating the lens module 200 therein, and a first magnet 410 and a first coil 430 for generating driving force to move the lens module 200 and the carrier 300 in the optical axis direction (the Z-axis direction).

The first magnet 410 is mounted on the carrier 300. As an example, the first magnet 410 may be mounted on a side surface of the carrier 300.

The first coil 430 is provided on a first substrate 470. As an example, the first coil 430 is provided on a surface of the first substrate 470. The first substrate 470 is mounted on a side surface of the housing 110 such that the first magnet 410 and the first coil 430 face each other in a direction perpendicular to the optical axis (the Z axis).

The housing 110 has four side surfaces. Among the four side surfaces, one side surface is provided with an opening 111. The first substrate 470 is mounted on the side surface of the housing 110 that is provided with the opening 111. A connection portion 471 is provided on a lower portion of the substrate 470, and the first substrate 470 is connected to the printed circuit board 630.

The first magnet 410 is a movable member mounted on the carrier 300 and moved together with the carrier 300 in the optical axis direction (the Z-axis direction), and the first coil 430 is a fixed member fixed to the housing 110.

When power is applied to the first coil 430, the carrier 300 is moved in the optical axis direction (the Z-axis direction) by an electromagnetic interaction between the first magnet 410 and the first coil 430.

Since the lens module 200 is accommodated in the carrier 300, the lens module 200 is also moved in the optical axis direction (the Z-axis direction) by the movement of the carrier 300. As will be described below with reference to FIG. 2, since the frame 310 and the lens module 200 are sequentially accommodated in the carrier 300, the frame 310 and the lens module 200 are also moved in the optical axis direction (the Z-axis direction) by the movement of the carrier 300.

Since the first magnet 410 is mounted on the carrier 300, the first magnet 410 is also moved together with the carrier 300 in the optical axis (Z-axis) direction.

As will be described below, since a second magnet 510a and a third magnet 530a are mounted on the lens module 200, the second and third magnets 510a and 530a are also moved together with the lens module 200 in the optical axis direction (the Z-axis direction).

Second and third coils 510b and 530b, disposed to face the second and third magnets 510a and 530a, are also moved in the optical axis direction (the Z-axis direction) by driving force generated by the first magnet 410 and the first coil 430.

Rolling members B1 are disposed between the carrier 300 and the housing 110 to reduce friction between the carrier 300 and the housing 110 when the carrier 300 is moved. The rolling members B1 may have a ball shape.

The rolling members B1 are disposed on opposite sides of the first magnet 410.

A yoke 440 is disposed to face the first magnet 410 in the direction perpendicular to the optical axis (the Z axis). As an example, the yoke 440 is mounted on the other surface of the first substrate 470, opposite the first coil 430. Therefore, the yoke 440 is disposed to face the first magnet 410 with the first coil 430 interposed therebetween.

Attractive force acts in the direction perpendicular to the optical axis (the Z axis), between the yoke 440 and the first magnet 410.

Therefore, the rolling members B1 are maintained in a state in which they are held in contact with the carrier 300 and the housing 110 by attractive force between the yoke 440 and the first magnet 410.

The yoke 440 serves to focus magnetic force of the first magnet 410. Therefore, generation of a leakage magnetic flux may be prevented.

As an example, the yoke 440 and the first magnet 410 form a magnetic circuit.

In various examples, a closed loop control manner of detecting and feeding back a position of the lens module 200 is used.

Therefore, a position sensor 450 is provided to perform a closed loop control. The position sensor 450 is disposed in a hollow portion formed in the center of the first coil 430 to face the first magnet 410. The position sensor 450 may be a hall sensor.

Hereinafter, the shake correction unit 500 of the lens driving device according to an example will be described with reference to FIG. 2.

The shake correction unit 500 is used to correct image blurring or moving picture shaking due to handshake, or the like, of a user when capturing an image or a moving picture.

For example, when a shake occurs at the time of capturing an image due to the handshake of the user, or the like, the shake correction unit 500 compensates for the shake by displacing the lens module 200 to be relatively displaced to correspond to the shake.

As an example, the shake correction unit 500 moves the lens module 200 in a direction perpendicular to the optical axis (the Z axis) to correct the shake.

The shake correction unit 500 includes a frame 310, guiding the movement of the lens module 200, and the second magnet 510*a* and the second coil 510*b* and the third magnet 530*a* and the third coil 530*b* generating driving force in a direction perpendicular to the optical axis (the Z axis).

The frame 310 and the lens holder 230 are sequentially arranged in the carrier 300 in the optical axis direction (the Z-axis direction), and serve to guide the movement of the lens barrel 210.

The frame 310 and the lens holder 230 are provided with a space in which the lens barrel 210 is inserted. The lens barrel 210 is inserted into the lens holder 230 to be fixed.

Since the frame 310 is disposed between the carrier 300 and the lens holder 230, a thickness of the frame 310 needs to be decreased to decrease a height of the camera module in the optical axis direction. However, when the thickness of the frame 310 is decreased, rigidity of the frame 310 may be reduced to deteriorate reliability to external impact or the like.

Accordingly, as illustrated in FIGS. 3 and 4, the frame 310 of the camera module may be provided with a reinforcing plate 330 to reinforce rigidity of the frame 310.

As an example, the reinforcing plate 330 is integrated with the frame 310 by insert molding. In this case, the reinforcing plate 330 may be manufactured to be integrated with the frame 310 by injecting a resin material into a mold in a state in which the reinforcing plate 330 is fixed in the mold.

The reinforcing plate 330 is disposed inside the frame 310, and a portion of the reinforcing plate 330 is exposed outwardly of the frame 310.

As an example, a portion of an upper surface 331 of the reinforcing plate 330 is exposed from an upper surface of the frame 310, and a portion of a lower surface portion 333 of the reinforcing plate 330 is exposed from a lower surface of the frame 310. A side surface of the reinforcing plate 330 is provided with a protrusion 335 exposed from a side surface of the frame 310.

As described above, a portion of the reinforcing plate 330 is exposed to various portions of the frame 310 while integrating the reinforcement plate 330 with the inside of the frame 310. Thus, coupling force of the reinforcing plate 330 and the frame 310 is improved and the reinforcement 330 is prevented from being separated from the frame 310.

The second and third magnets 510*a* and 530*a* are disposed in a position close to the frame 310. Therefore, the reinforcing plate 310 may be formed of a non-magnetic metal to prevent the movement of the second and third magnets 510*a* and 530*a* from being disturbed during shake correction.

The frame 310 and the lens holder 230 are moved in the direction perpendicular to the optical axis (the Z axis), with respect to the carrier 300 by the driving force generated by the second and third magnets 510*a* and 530*a* and the second and third coils 510*b* and 530*b*.

The second magnet 510*a* and the second coil 510*b* generate driving force in a first axis direction (an X-axis direction), perpendicular to the optical axis (the Z axis), and the third magnet 530*a* and the third coil 530*b* generate driving force in a second axis direction (a Y-axis direction), perpendicular to the first axis (the X axis). For example, the second magnet 510*a* and the second coil 510*b* generate driving force in a direction in which they face each other, and the third magnet 530*a* and the third coil 530*b* also generate driving force in a direction in which they face each other.

The second axis (the Y axis) is perpendicular to both the optical axis (the Z axis) and the first axis (the X axis).

The second and third magnets 510*a* and 530*a* are disposed to be orthogonal to each other in a plane, perpendicular to the optical axis (the Z axis), and the second and third coils 510*b* and 530*b* are also disposed to be orthogonal to each other in the plane, perpendicular to the optical axis (the Z axis).

The second and third magnets 510*a* and 530*a* are mounted on the lens holder 230.

Side surfaces of the lens holder 230 include a first surface and a second surface, perpendicular to each other. The second magnet 510*a* is disposed on the first surface of the lens holder 230, and the third magnet 530*a* is disposed on the second surface of the lens holder 230.

The second and third coils 510*b* and 530*b* may be provided on a second substrate 550. As an example, the second and third coils 510*b* and 530*b* may be provided on a surface of the second substrate 550 to face the second and third magnets 510*a* and 530*a*. Meanwhile, mounting positions of the second magnet 510*a* and the second coil 510*b* may be interchangeable. Also, mounting positions of the third magnet 530*a* and the third coil 530*b* may be interchangeable.

The second substrate 550 is mounted on the housing 110.

As an example, the second substrate 550 may be mounted on two side surfaces of the carrier 300.

The carrier 300 has four side surfaces and, among the four side surfaces, at least two side surfaces are provided with openings 302 and 303. The second substrate 550 is mounted on two side surfaces of the carrier 300 that are provided with the openings 302 and 303.

Since the first coil 430 is provided on the first substrate 470 mounted on a side surface of the housing 110 and the second and third coils 510*b* and 530*b* are provided on the second substrate 550 mounted on a side surface of the carrier 300, the second and third coils 510*b* and 530*b* may be disposed to be closer to the optical axis of the lens module 200 than the first coil 430.

During shake correction, the second and third magnets 510*a* and 530*a* are movable members, moving in the direction perpendicular to the optical axis (the Z axis) together with the lens holder 230, and the second and third coils 510*b* and 530*b* are fixed members fixed to the carrier 300.

Since the carrier 300 may be moved in the optical axis (the Z axis), the second substrate 550 and the second and third coils 510*b* and 530*b* may also be moved together with the carrier 300 in the optical axis direction (the Z-axis direction). For example, the second substrate 550 and the second and third coils 510b and 530b are moved together with the carrier 300 in the optical axis direction (the Z-axis direction) during focusing.

The camera module 1 is provided with a plurality of ball members for supporting the frame 310 and the lens holder 230. The plurality of ball members serves to guide the movements of the frame 310, the lens holder 230, and the lens barrel 210 in the shake correction process. The plurality of ball members also serves to maintain spacing between the carrier 300, and the frame 310 and the lens holder 230.

The plurality of ball members includes first ball members B2 and second ball members B3.

The first ball members B2 guide the movement of the frame 310, the lens holder 230, and the lens barrel 210 in the first axis direction (the X-axis direction), and the second ball members B3 guide the movement of the lens holder 230 and the lens barrel 210 in the second axis direction (the Y-axis direction).

As an example, the first ball members B2 are moved in a rolling motion in the first axis direction (the X-axis direction) when the driving force is generated in the first axis direction (the X-axis direction). Therefore, the first ball members B2 guide the movement of the frame 300 and the lens holder 230 in the first axis direction (the X-axis direction).

The second ball members B3 are moved in a rolling motion in the second axis direction (the Y-axis direction) when the driving force is generated in the second axis direction (the Y-axis direction). Therefore, the second ball members B3 guide the movement of the lens holder 230 and the lens barrel 210 in the second axis direction (the Y-axis direction).

The first ball members B2 include a plurality of ball members disposed between the carrier 300 and the frame 310, and the second ball member B3 includes a plurality of ball members disposed between the frame 310 and the lens holder 230.

First guide groove portions 301, accommodating the first ball members B2 therein, are formed in at least one surface among surfaces of the carrier 300 and the frame 310 facing each other in the optical axis direction (the Z-axis direction). The first guide groove portions 301 include a plurality of guide grooves, respectively corresponding to the plurality of ball members of the first ball members B2.

The first ball members B2 are accommodated in the first guide groove portions 301 and are fitted between the carrier 300 and the frame 310.

Movement of the first ball members B2 is restricted in the optical axis direction (the Z-axis direction) and the second axis direction (the Y-axis direction), and the first ball members B2 may only be moved in the first axis direction (the X-axis direction), in a state in which the first ball members B2 are accommodated in the first guide groove portions 301. As an example, the first ball members B2 may be moved in a rolling motion in only the first axis direction (the X-axis direction).

To enable this, a planar shape of each of the plurality of guide grooves of the first guide groove portions 301 is a rectangular shape having a length in the first axis direction (the X-axis direction).

Second guide groove portions 311, accommodating the second ball members B3 therein, are formed in at least one surface among surfaces of the frame 310 and the lens holder 230 facing each other in the optical axis direction (the Z-axis direction). The second guide groove portions 311 include a plurality of guide grooves, respectively corresponding to the plurality of ball members of the second ball members B3.

The second ball members B3 are accommodated in the second guide groove portions 311 and are fitted between the frame 300 and the lens holder 230.

Movement of the second ball members B3 is restricted in the optical axis direction (the Z-axis direction) and the first axis direction (the X-axis direction), and the second ball members B3 may only be moved in the second axis direction (the Y-axis direction), in a state in which the second ball members B3 are accommodated in the second guide groove portions 311. As an example, the second ball members B3 may only be moved in a rolling motion in the second axis direction (the Y-axis direction).

To enable this, a planar shape of each of the plurality of guide grooves of the second guide groove portions 311 is a rectangular shape having a length in the second axis direction (the Y-axis direction).

When driving force is generated in the first axis direction (the X-axis direction), the frame 310, the lens holder 230, and the lens barrel 210 are moved together in the first axis direction (the X-axis direction).

The first ball members B2 are moved in a rolling motion in the first axis direction (the X-axis direction). In this case, movement of the second ball members B3 is restricted.

When driving force is generated in the second axis direction (the Y-axis direction), the lens holder 230 and the lens barrel 210 are moved in the second axis direction (the Y-axis direction).

The second ball members B3 are moved in a rolling motion in the second axis direction (the Y-axis direction). In this case, movement of the first ball members B2 is restricted.

In various examples, in a shake correcting process, a closed loop control manner of detecting and feeding back a position of the lens barrel 210 is used.

Accordingly, position sensors 510c and 530c are provided to perform a closed loop control. Two position sensors 510c and 530c are provided, and are respectively disposed in hollow portions formed in the centers of the second and third coils 510b and 530b to face the second magnets 510a and 530a. The position sensors 510c and 530c may be hall sensors.

First and second yokes 710 and 730 are provided to maintain the shake correction unit 500 and the first and second ball members B2 and B3 in contact with each other.

The first and second yokes 710 and 730 are fixed to the carrier 300, and are respectively disposed to face the second and third magnets 510a and 530a in the optical axis direction (the Z-axis direction).

Accordingly, attractive force is generated in the optical axis direction (the Z-axis direction) between the first yoke 710 and the first magnet 510a and between the second yoke 730 and the second magnet 530a.

Since the lens holder 230 and the frame 310 are pressed toward the first and second yokes 710 and 730 by the attractive force between the first yoke 710 and the first magnet 510a and between the second yoke 730 and the second magnet 530a, the frame 310 and the lens holder 230 are maintained in a state in which they are in contact with the first and second ball members B2 and B3.

The first and second yokes 710 and 730 are formed of a material generating the attractive force between the first yoke 710 and the first magnet 510a and between the second yoke 730 and the second magnet 530a. As an example, the first and second yokes 710 and 730 may be formed of a magnetic material.

A stopper 320 is coupled to the carrier 300 to cover at least a portion of an upper portion of the lens holder 230.

The stopper 320 prevents the frame 310 and the lens holder 230 being separated outwardly of the carrier 300.

Figure 5:
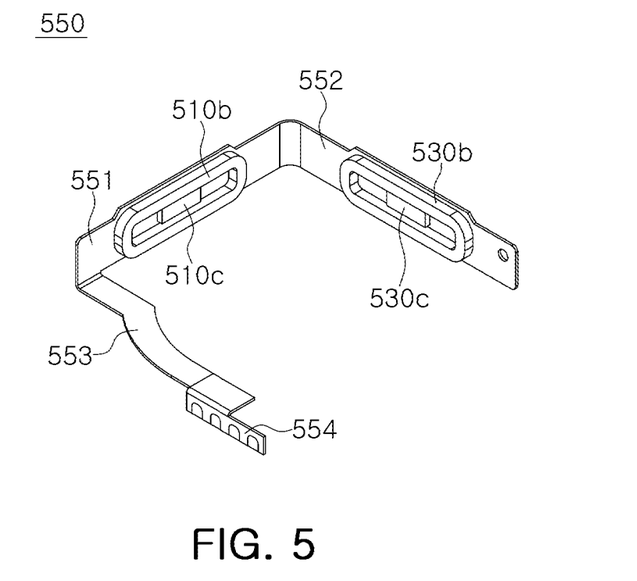
FIG. 5 is a perspective view of a second substrate.
Figure 6:
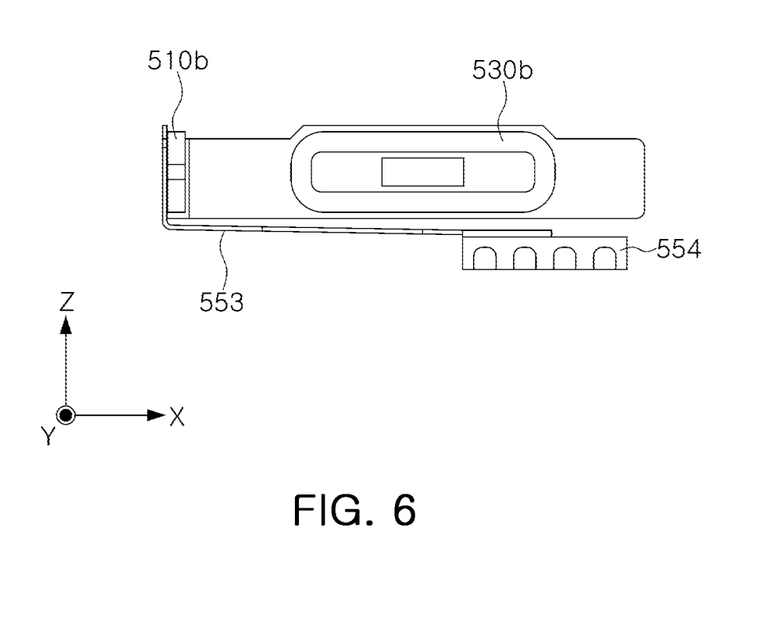
FIG. 6 is a side view of the second substrate.
Figure 7:
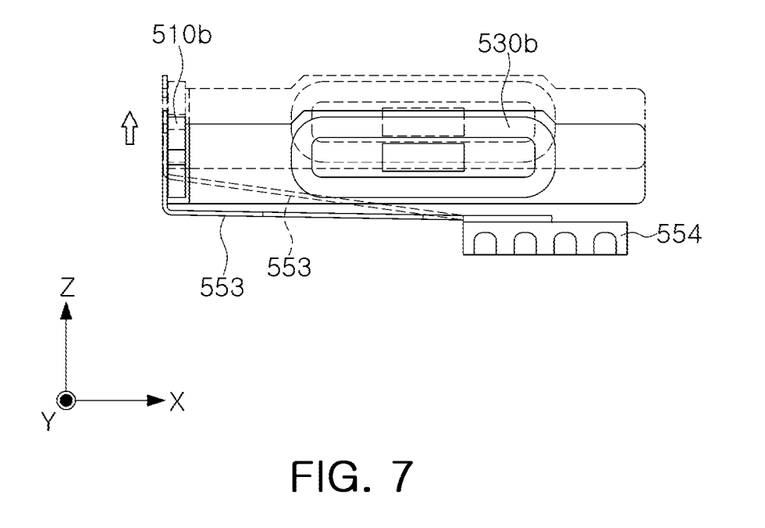
FIGS. 7 and 8 illustrate movement of the second substrate in an optical axis direction.
Figure 8:
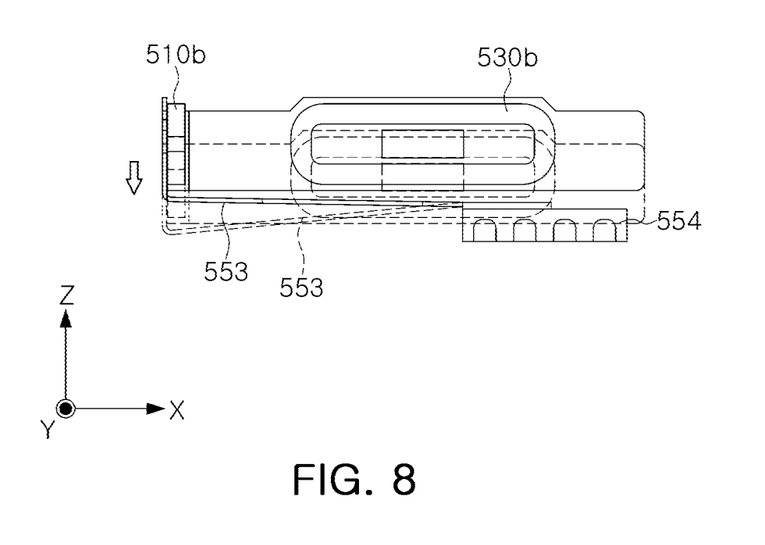

FIG. 5 is a perspective view of a second substrate, FIG. 6 is a side view of the second substrate, and FIGS. 7 and 8 illustrate movement of the second substrate in an optical axis direction.

Figure 9:
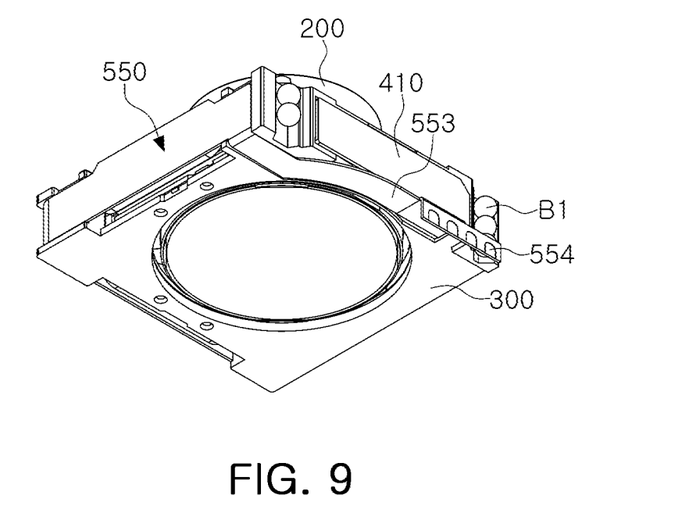
FIG. 9 is a bottom perspective view of a state in which the second substrate is mounted on a carrier.
Figure 10:
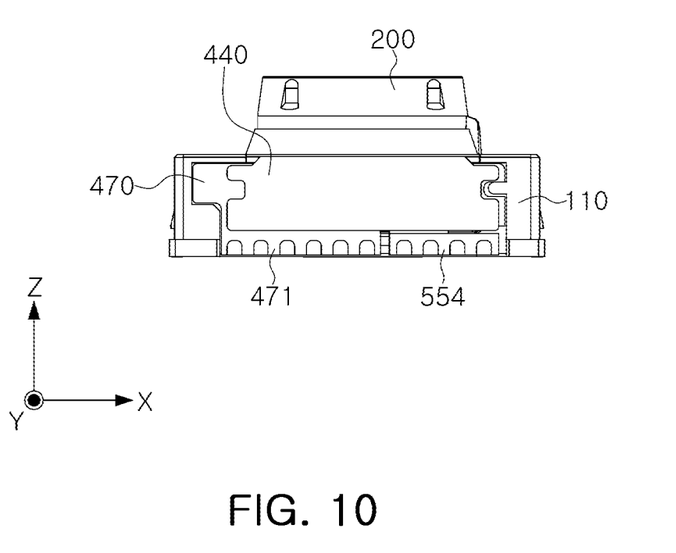
FIG. 10 is a side view in a state in which a case is removed from the camera module according to an example.

FIG. 9 is a bottom perspective view in a state in which the second substrate is mounted on a carrier, and FIG. 10 is a side view in a state in which a case is removed from the camera module according to an example.

Referring to FIG. 5, the second substrate 550 may be a flexible circuit board, and includes a body portion, an extension portion 553, and a connection portion 554. The body portion may include a first body portion 551 and a second body portion 552.

A surface of the first body portion 551 is provided with the second coil 510b, and a surface of the second body portion 552 is provided with the third coil 530b. The first body portion 551 and the second body portion 552 are mounted on side surfaces of the carrier 300 provided with openings 302 and 303, among side surfaces of the carrier 300.

The first body portion 551 and the second body portion 552 may be connected to each other to have a '¬'-shaped plane. For example, the first body portion 551 and the second body portion 552 may have a '¬' shape when viewed in an optical axis direction.

The extension portion 553 extends from one of the first body portion 551 and the second body portion 552. As an example, the extension portion 553 may extend from the first body portion 551.

The extension portion 553 is disposed between the housing 110 and the carrier 300. At least one of surfaces, on which the housing 110 and the carrier 300 face each other in an optical axis direction (a Z-axis direction), is provided with a groove portion into which the extension portion 553 is inserted.

One side of the extension portion 553 extends from one of the first body portion 551 and the second body portion 552, and the other side of the extension portion 553 is mounted on the housing 110.

The connection portion 554 is provided on an end of the extension portion 553. As an example, one side end of the extension portion 553 may be connected to the first body portion 551, and the other side end of the extension portion 553 may be connected to the connection portion 554. The connection portion 554, provided on the other side end of the extension portion 553 may be mounted on the housing 110.

The connection portion 554 is configured to receive an electrical signal from an external entity (for example, the printed circuit board 630).

The connection portion 554 is led outwardly of the housing 110 through the opening 111 provided in a side surface of the housing 110, and the second substrate 550 is connected to the printed circuit board 630 through the connection portion 554.

For example, the connection portion 471 of the first substrate 470 and the connection portion 554 of the second substrate 550 are disposed on the side surface of the housing 110 having the opening 111.

When lenses are focused, the second substrate 550 may be moved together with the carrier 300 in the optical axis direction (the Z-axis) direction.

For example, as illustrated in FIGS. 7 and 8, when the carrier 300 is moved in the optical axis direction (the Z-axis direction) by driving force of the first magnet 410 and the first coil 430, the second substrate 550 may be moved in the optical axis direction (the Z-axis direction) in a state in which the connection portion 554 is connected to the printed circuit board 630.

When the carrier 300 is moved in the optical axis direction (the Z-axis direction), the extension portion 553 may be moved in the optical axis direction (the Z-axis direction) with respect to the first body portion 551 to significantly reduce loss of tension applied to the second substrate 550.

A least a portion of the extension portion 553 may be bent to significantly reduce an effect of the tension generated when the second substrate 550 is moved in the optical axis direction (the Z-axis direction).

For example, at least a portion of the extension portion 553 may have a curved or folded shape in a direction perpendicular to the optical axis (the Z axis) and/or in the optical axis direction (the Z-axis direction).

The carrier 300 has a through-hole 304 (see FIG. 2), through which light incident on the lens module 200 passes, such that the image sensor 610 receives the light. The extension portion 553 has a shape curved along a circumference of the through-hole 304.

The camera module 1 according to an example is configured such that a relative position of the second magnet 510a and the second coil 510b (a position of the second magnet 510a and the second coil 510b in the optical axis direction (the Z-axis direction)) and a relative position of the third d magnet 530a and the third coil 530b (a position of the third magnet 530a and the third coil 530b in the direction of the optical axis (Z-axis direction)) do not vary even when the lens module 200 is moved in the optical axis direction (the Z-axis direction) during a focusing operation. Therefore, driving force for shake correction may be precisely controlled.

Furthermore, a relative position of the first magnet 410 and the first coil 430 (a position of the first magnet 410 and the first coil 430 in the direction perpendicular to the optical axis (the Z axis)), does not vary even when the lens module 200 is moved in the direction perpendicular to the optical axis (the Z axis), during the shake correction operation. Therefore, driving force for shake correction may be precisely controlled.

As described above, a camera module according to an example may improve shake correction performance and focusing performance.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
    a carrier configured to accommodate a lens module therein;
    a housing configured to accommodate the lens module and the carrier therein;
    a focusing unit comprising a first magnet disposed in the carrier and a first coil disposed on a first substrate disposed on the housing; and
    a shake correction unit comprising a second magnet and a third magnet disposed in the lens module, and a second coil and a third coil disposed on a second substrate disposed on the carrier,
    wherein the first magnet and the first coil are disposed to face each other in a first direction perpendicular to an optical axis,
    wherein the second magnet and the second coil are disposed to face each other in the first direction perpendicular to the optical axis, and the third magnet and the third coil are disposed to face each other in a second direction perpendicular to the optical axis,
    wherein the second magnet and the second coil, and the third magnet and the third coil, are moved together in an optical axis direction by driving force generated by the first magnet and the first coil,
    wherein the second substrate comprises a body portion disposed on a side surface of the carrier and configured to be movable in the optical axis direction with respect to the housing, a connection portion fixed to the housing and exposed outwardly of the housing through an opening on a side surface of the housing, and an extension portion connecting the body portion and the connection portion,
    wherein the second coil and the third coil are disposed on the body portion,
    wherein the extension portion extends from the body portion and a portion of the extension portion is configured to be moved in the optical axis direction together with the body portion when the carrier is moved in the optical axis direction, and
    wherein at least an intermediate portion of the extension portion is curved in the optical axis direction.

2. The camera module of claim 1, wherein the extension portion is configured to be movable in the optical axis direction by the driving force generated by the first magnet and the first coil.

3. The camera module of claim 2, wherein at least a portion of the extension portion is curved.

4. The camera module of claim 1, wherein the extension portion is disposed between the carrier and the housing.

5. The camera module of claim 4, wherein the carrier defines a through-hole through which light passes, and at least a portion of the extension portion is bent along a circumference of the through-hole.

6. The camera module of claim 1, wherein the extension portion has a first end connected to the body portion and a second end connected to the housing, and
    the second end of the extension portion comprises the connection portion configured to receive an electrical signal.

7. The camera module of claim 1, wherein the first substrate is disposed on the side surface of the housing.

8. The camera module of claim 1, wherein the second coil and the third coil are both disposed closer to the optical axis than the first coil.

9. The camera module of claim 1, wherein the shake correction unit comprises a frame configured to guide a movement of the lens module, and
    the frame and the lens module are configured to move together in the first direction by driving force generated by the second magnet and the second coil.

10. The camera module of claim 9, wherein a reinforcing plate is disposed inside the frame, and a portion of the reinforcing plate is exposed outwardly of the frame.

11. The camera module of claim 9, wherein the lens module is configured to move in the second direction by driving force generated by the third magnet and the third coil.

12. A camera module comprising:
    a carrier configured to accommodate a lens module therein;
    a housing configured to accommodate the lens module and the carrier therein;
    a focusing unit comprising a first magnet disposed on the carrier and a first coil disposed to face the first magnet in a first direction perpendicular to an optical axis;
    a shake correction unit comprising a second magnet and a second coil disposed on the lens module to face each other in the first direction perpendicular to the optical axis, and a third coil and a third magnet disposed on the lens module to face each other in a second direction perpendicular to the optical axis; and
    a substrate, on which the second coil and the third coil are disposed,
    wherein the lens module, the carrier, the second magnet and the third magnet, the second coil and the third coil, and the substrate are configured to move together in an optical axis direction by a driving force generated by the first magnet and the first coil,
    wherein a first portion of the substrate is disposed on the carrier and configured to be movable in the optical axis direction with respect to the housing, a second portion of the substrate is disposed on the housing and exposed outwardly of the housing through an opening on a side surface of the housing, and a third portion of the substrate connects the first portion to the second portion,
    wherein the first portion of the substrate comprises a first body portion on which the second coil is disposed and a second body portion on which the third coil is disposed, and
    wherein a part of the third portion is configured to be moved in the optical axis direction together with the first portion when the carrier is moved in the optical axis direction, and
    wherein an intermediate portion of the third portion is curved in the optical axis direction.

13. The camera module of claim 12, wherein the third portion of the substrate extends from one of the first body portion and the second body portion and is disposed between the carrier and the housing.

14. The camera module of claim 13, wherein the first direction is perpendicular to the second direction.

15. The camera module of claim 14, wherein the first body portion is elongated in the first direction, the second body portion is elongated in the second direction, and the third portion of the substrate is elongated in the first direction or the second direction and is curved along the optical axis direction.

* * * * *